United States Patent [19]

Keshlear et al.

[11] Patent Number: 4,727,485
[45] Date of Patent: Feb. 23, 1988

[54] PAGED MEMORY MANAGEMENT UNIT WHICH LOCKS TRANSLATORS IN TRANSLATION CACHE IF LOCK SPECIFIED IN TRANSLATION TABLE

[75] Inventors: William M. Keshlear, Richmond; Robert B. Cohen, Austin, both of Tex.

[73] Assignee: Motorola, Inc., Schaumburg, Ill.

[21] Appl. No.: 815,613

[22] Filed: Jan. 2, 1986

[51] Int. Cl.$^4$ .............................................. G06F 12/10
[52] U.S. Cl. ..................................................... 364/200
[58] Field of Search ... 364/200 MS File, 900 MS File

[56] References Cited

U.S. PATENT DOCUMENTS

| | | | |
|---|---|---|---|
| 3,970,999 | 7/1976 | Elward | 364/200 |
| 4,038,645 | 7/1977 | Birney et al. | 364/200 |
| 4,084,226 | 4/1978 | Anderson et al. | 364/200 |
| 4,084,230 | 4/1978 | Matick | 364/200 |
| 4,638,426 | 1/1987 | Chang et al. | 364/200 |

*Primary Examiner*—Thomas M. Heckler
*Attorney, Agent, or Firm*—John A. Fisher; Jeffrey Van Myers

[57] ABSTRACT

In a data processing system, a paged memory management unit (PMMU) translates logical addresses provided by a processor to physical addresses in a memory using translators constructed from page descriptors comprising, in part, translation tables stored in the memory. The PMMU maintains a set of recently used translators in a translator cache. In response to a particular lock value contained in a lock field of the page descriptor for a particular page, the PMMU sets a lock indicator in the translator cache associated with the corresponding translator, to preclude replacement of this translator in the translator cache. A lock warning mechanism provides a lock warning signal whenever all but a predetermined number of the translators in the cache are locked. In response, the PMMU can warn the processor that the translator cache is in danger of becoming full of locked translators. Preferably, the PMMU is also inhibited from locking the last translator in the cache.

4 Claims, 2 Drawing Figures

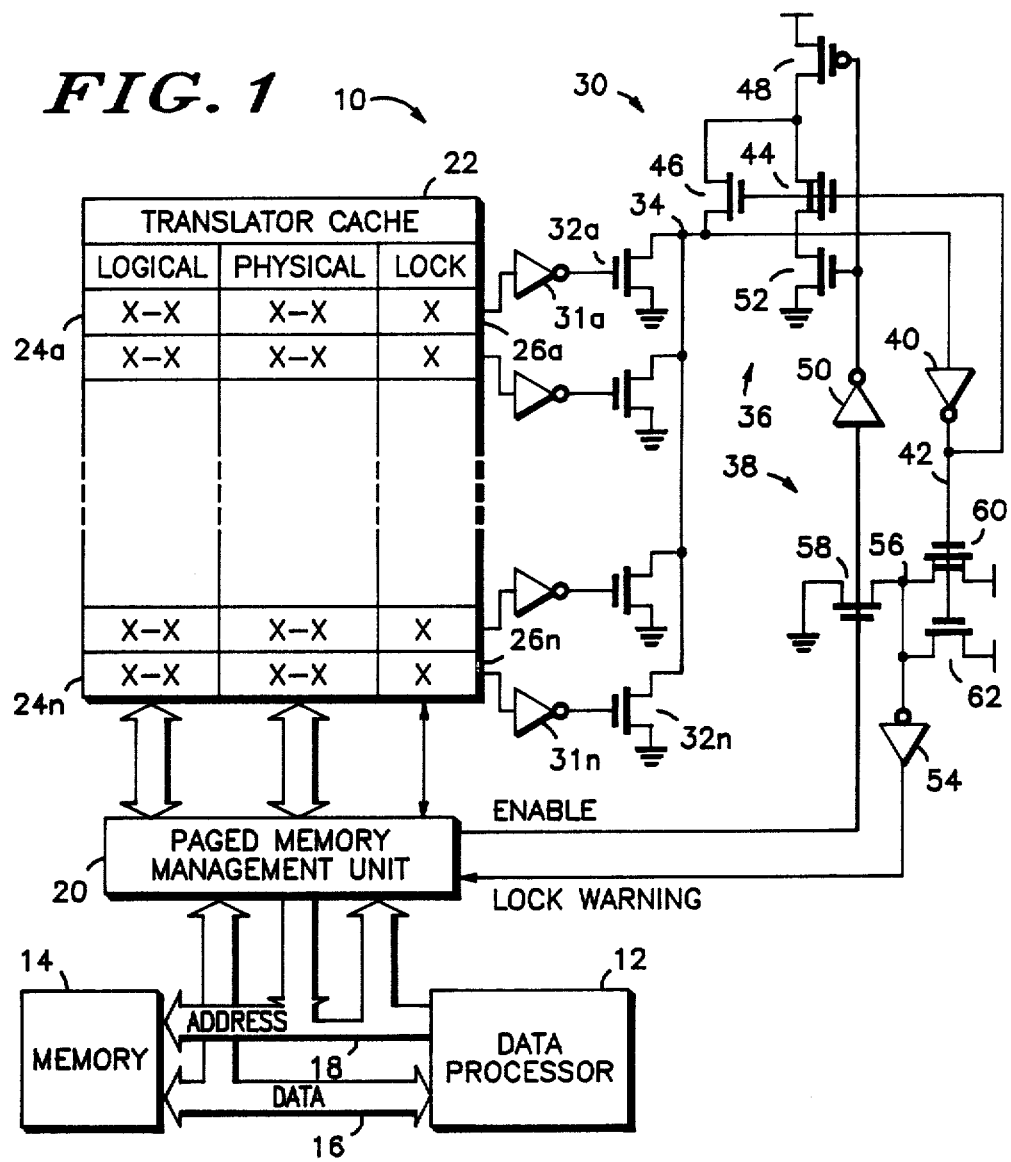
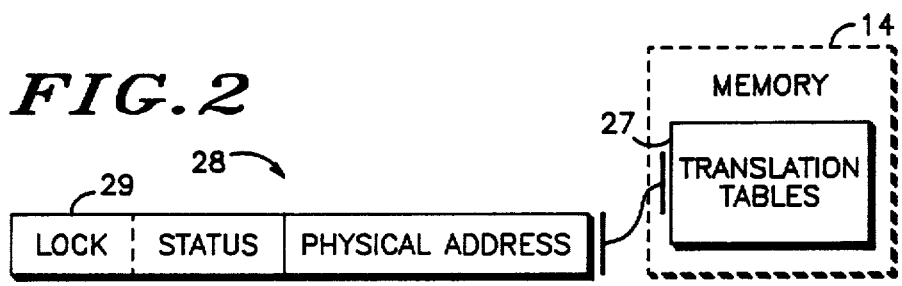

PAGED MEMORY MANAGEMENT UNIT WHICH LOCKS TRANSLATORS IN TRANSLATION CACHE IF LOCK SPECIFIED IN TRANSLATION TABLE

Cross Reference to Related applications

Related subject matter is disclosed in the following copending applications, all of which are assigned to the same Assignee as the subject invention:

1. U.S. application Ser. No. 718,753 entitled PAGED MEMORY MANAGEMENT UNIT HAVING VARIABLE NUMBER OF TRANSLATION TABLE LEVELS, invented by William Mall Keshlear, William C. Moyer and John Zolnowsky, filed 1 Apr. 1985;

2. U.S. application Ser. No. 718,669 entitled PAGED MEMORY MANAGEMENT UNIT HAVING VARIABLE SIZED TRANSLATION TABLES, invented by William C. Moyer, John Zolnowsky and William Mall Keshlear, filed 1 Apr. 1985;

3. U.S. application Ser. No. 718,608 entitled PAGED MEMORY MANAGEMENT UNIT HAVING SELECTED TRANSLATION TABLE INDEXES, invented by Michael W. Cruess, William Mall Keshlear and John Zolnowsky, filed 1 Apr. 1985; and 4. U.S. application Ser. No. 812,566 entitled LOCK WARNING MECHANISM FOR A CACHE, invented by William C. Moyer, Ralph C. McGarity, James G. Gay and Jesse R. Wilson, filed 23 Dec. 1985.

BACKGROUND OF THE INVENTION

In certain applications, such as the management of the memory of a data processing system, a cache is utilized to maintain associated information which has different periods of utility. For example, in the paged memory management unit (PMMU) described in the several copending applications cited above, logical-to-physical address translators are maintained in a translator cache. Often, it is desired to assure rapid access to certain code/data pages. This in turn requires that the translators for these pages be available in the cache for the required period of time. One solution has been to associate with each translator in the cache a lock indicator which, when set, will preclude removal of the translator in order to make room for a different transistor. When a given page is no longer needed, the PMMU can be instructed by the processor to reset the lock indicator for the translator for that page, thereby making this translator a candidate for replacement.

In general, prior art systems have imposed the burden of locking specific translators in the translation cache upon the operating system. For example, in U.S. Pat. No. 4,084,226, translators are individually locked or unlocked by the memory management unit in response to receiving direct commands from the processor. (See, for example, lines 32–34 of column 68). However, this technique requires the operating system to intervene in the translation process whenever a translator needs to be locked in the translation cache.

SUMMARY OF THE INVENTION

Accordingly, it is an object of the present invention to provide a mechanism which allows a paged memory management unit to determine automatically from a field in each page descriptor in the translation tables whether the corresponding translator should be locked in the translation cache.

Another object of the present invention is to provide an efficient way to indicate, in a field in each page descriptor in the translation tables, that certain translators are to be locked in the translation cache.

In carrying out these and other objects of the present invention, there is provided, in one form, a paged memory management unit (PMMU) adapted to translate each of a plurality of logical addresses into a corresponding physical address using a selected one of a plurality of page descriptors comprising one or more translation tables stored in a memory, the PMMU assembling each of said logical addresses and the corresponding physical address into a respective translator. In the preferred form, the PMMU includes: a cache having a plurality of storage locations for storing the translators, each storage location having an associated lock indicator adapted to be selectively set; and control logic for storing a translator in a selected one of the storage locations only if the associated lock indicator is reset, the control logic setting the lock indicator of that storage location only in response to a lock signal associated with the translator. According to the present invention, the lock signal comprises a lock bit stored in the memory as a portion of the page descriptor used by the PMMU to assemble each translator, the control logic being responsive to the state of this lock bit to selectively set the lock indicator associated with the storage location selected to store the respective translator.

BRIEF DESCRIPTION OF THE DRAWINGS

FIG. 1 is a schematic diagram of a lock warning circuit constructed in accordance with the present invention.

FIG. 2 illustrates the preferred form of the page descriptors comprising in part the translation tables stored in the memory of FIG. 1.

DETAILED DESCRIPTION OF THE INVENTION

Shown in FIG. 1 is a data processing system 10 comprising a data processor 12 and a memory 14 coupled thereto via data and address busses 16 and 18, respectively. A paged memory management unit (PMMU) 20 translates a logical portion of the address provided by the processor 12 to the memory 14 via the address bus 18 into a corresponding portion of the physical address. Associated with the PMMU 20 is a translator cache 22 comprising a plurality of storage locations 24a–24n, each of which has an associated lock indicator 26a–26n, respectively. In response to each logical address provided by the processor 12, the PMMU 20 searches the translator cache 22 for a corresponding logical-to-physical translator. If none is found, the processor 12 is directed to abort the access cycle and release the buses 16–18 so that the PMMU 20 can access a set of translation tables 27 stored in the memory 14 (see, FIG. 2) to find a corresponding page descriptor 28 which defines the proper logical-to-physical address translator to enter in the translator cache 22. Subsequently, when the processor 12 restarts the aborted access cycle, the PMMU 20 will use the new translator in the translator cache 22 to determine the proper physical address to forward to the memory 14. Thereafter, whenever the processor 12 again accesses a logical address in the same logical page, the PMMU 20 will reuse the translator in the translator cache 22. Reference may be made to the copending U.S. patent applications set forth above for a detailed description of a paged memory management unit adapted to perform such logical-to-physical address translations using translation tables resident in memory.

If, due to the processing activity of the processor 12, all of the storage locations 24a-24n in the translator cache 22 become full, the PMMU 20 must use a suitable replacement algorithm to determine which existing translator to replace with the new translator. In order to prevent certain translators from being considered candidates for this replacement algorithm, the respective page descriptor 28 in the translation tables 27 stored in the memory 14 contains a lock field 29. If, when the PMMU 20 uses a particular page descriptor to build a translator for entry into the translator cache 22, this lock field 29 contains a "lock" value, the PMMU 20 will set the lock bit 26x of the storage location 24x selected to store the corresponding translator. So long as a particular lock bit 26x is set, the corresponding storage location 24x will not be a candidate for the replacement algorithm.

In order to detect when the translator cache 22 is in danger of filling up with locked translators, a lock warning circuit 30 is coupled to each of the lock bits 26a-26n, via corresponding inverting buffers 31a-31n and pull-down transistors 32a-32n wire ORed to a node 34. In general, if the voltage on the node 34 rises above a certain level because all but one (1) of the lock bits 26a-26n are set, a self-biasing sense amplifier 36 will provide a LOCK WARNING signal to the PMMU 20 via a level shifter 38.

In the illustrated form, the sense amplifier 36 is comprised of a CMOS inverter 40, the input of which is coupled to node 34 and the output of which is coupled to a node 42, and a pair of n-channel transistors 44 and 46 which source current to node 34 at a rate dependent upon the voltage on node 42. Transistor 44 operates in the depletion mode to source a trickle current to the de 34 while transistor 46 sources current to the node 34 at a rate substantially proportional to the voltage on node 42. Current for the transistors 44 and 46 is provided by a p-channel transistor 48 in response to an ENABLE signal provided by the PMMU 20 via an inverter 50. In the absence of the ENABLE signal, transistor 48 will source no current while an n-channel transistor 52 sinks current from the node 34 so that the voltage on the node 34 is pulled below the switch point of inverter 40.

In the preferred embodiment, transistor 46 is sized to source substantially the same amount of current as one (1) of the transistors 32a-32n can sink, so that transistors 44 and 46 together can maintain the voltage on the node 34 above the switch point of inverter 40 so long as only one (1) of the pull-down transistors 32a-32n is turned on by the corresponding lock bit 26a-26n being reset. However, whenever two (2) or more of the lock bits 26a-26n are reset, transistors 44 and 46 will be overpowered by the sum of the active pull-down transistors 32a-32n, and the voltage on the node 34 will drop below the switch point of inverter 40. Thus, the voltage on node 42 will vary depending upon how many of the lock bits 26a-25n are reset.

The level shifter 38 is comprised of a CMOS inverter 54, the input of which is coupled to a node 56 and the output of which is coupled to PMMU 20, an n-channel transistor 58 which sinks current from node 56 in response to the ENABLE signal, and a pair of n-channel transistors 60 and 62 which source current to node 56 at a rate dependent upon the voltage on node 42. As in the sense amplifier 36, transistor 60 operates in the depletion mode to source a trickle current to the node 56 while transistor 62 sources current to the node 56 at a rate substantially proportional to the voltage on node 42. By sizing transistors 60 and 58/62 the same as transistors 44 and 46, respectively, the inverter 54 will shift the level on node 42 to normal logic levels. Thus, inverter 54 will provide the LOCK WARNING signal only when less than two (2) of the lock bits 26a-25n are reset or, viewed from another perspective, when all but one (1) of the lock bits 26a-25n are set.

In response to the LOCK WARNING signal, PMMU 20 can set an appropriate status indicator or otherwise signal the processor 12 that the translator cache 22 is in danger of being filled with locked translators. In the preferred form, the LOCK WARNING signal will inhibit the setting of the lock bit 26x of the remaining unlocked storage location 24x, so that the PMMU 20 is assured of having at least one storage location in the translator cache 22 in which to enter new translators. Thus, although performance will be degraded, at least the system 10 is able to continue operation until the processor 12 is able to resolve the problem.

Once a particular page is no longer needed, the processor 12 can instruct the PMMU 20 to "flush" the corresponding translator from the translator cache 22. In response, the PMMU 20 will set an indicator that the particular storage location 24x containing this translator is no longer valid, or at least is a candidate for replacement. If the associated lock bit 26x is set, the PMMU 20 will also need to reset this lock bit 26x. In other words, those storage locations 24a-24n which are locked can only be unlocked at the specific direction of the processor 12, but at least one (1) of the storage locations 24a-24n is always unlocked.

Although the lock field 29 has been disclosed herein as comprising a portion of the page descriptors 28, it may be advantageous in some systems to provide a lock field higher in the translation tables 27, e.g. in the pointer descriptors, so that related sets of translators can be marked for locking with a single entry in the translation tables. If desired, the PMMU 20 can be adapted to also lock specific translators in the cache 22 in response to direct commands from the processor 12. Similarly, the PMMU 20 may by adapted to unlock individual translators in the cache 22, if commanded to do so by the processor 12, without wholly invalidating those translators.

We claim:

1. In a paged memory management unit (PMMU) which translates each of a plurality of logical addresses into a corresponding physical address using a selected one of a plurality of page descriptors comprising one or more translation tables stored in a memory, the PMMU assembling each of said logical addresses and the corresponding physical address into a respective translator, said PMMU including:

a cache having a plurality of storage locations for storing said translators, each storage location having an associated lock indicator which may be selectively set; and control means for storing a translator in a selected one of said storage locations only if the associated lock indicator is reset, the control means setting the lock indicator of said one storage location in response to a lock signal associated with said translator;

the improvement wherein the lock signal comprises a lock field stored in said memory as a portion of the page descriptor used by the PMMU to assemble each translator, said control means being responsive to the value of said lock field to selectively set the lock indicator associated with the storage location selected to store the respective translator.

2. In the PMMU of claim 1, the further improvement wherein the control means sets the lock indicator of a selected storage location only if the lock indicator of at least one other storage location is not set.

3. In a paged memory management unit (PMMU) which translates each of a plurality of logical addresses into a corresponding physical address using a selected one of a plurality of page descriptors comprising one or more translation tables stored in a memory, wherein the PMMU assembles each of said logical addresses and the corresponding physical address into a respective translator and selectively locks said translator in a translator cache in response to a lock signal associated with said translator, the improvement in that the lock signal comprises a lock field of the page descriptor used to assemble said translator.

4. In the PMMU of claim 3, the further improvement wherein the PMMU locks a translator in the cache only if the cache will not thereby become full of locked translators.

* * * * *